US006288795B1

(12) United States Patent
Urasawa

(10) Patent No.: US 6,288,795 B1
(45) Date of Patent: Sep. 11, 2001

(54) METHOD AND APPARATUS FOR CONVERTING CONTINUOUS-TONE IMAGES TO BI-LEVEL IMAGES

(75) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/210,102

(22) Filed: Dec. 11, 1998

(30) Foreign Application Priority Data

Dec. 17, 1997 (JP) .................................................. 9-363980

(51) Int. Cl.[7] .......................... H04N 1/405; H04N 1/407
(52) U.S. Cl. ........................ 358/1.9; 358/457; 358/460; 358/458
(58) Field of Search .......................... 358/1.9, 457, 460, 358/456, 458, 466, 298; 382/237, 270

(56) References Cited

U.S. PATENT DOCUMENTS 5,553,200 * 9/1996 Accad ................................. 358/1.9
6,014,499 * 1/2000 Sasaki ................................. 358/1.9

FOREIGN PATENT DOCUMENTS

| 7-123264 | * | 5/1995 | (JP) | ............................... H04N/1/407 |
| 8-018787 | * | 1/1996 | (JP) | ............................... H04N/1/407 |
| 8-181876 | * | 7/1996 | (JP) | ............................... H04N/1/405 |

* cited by examiner

Primary Examiner—Scott Rogers
(74) Attorney, Agent, or Firm—Akin, Gump, Strauss, Hauer & Feld, L.L.P.

(57) ABSTRACT

A continuous-tone image is converted to a bi-level image by first applying an inverse gamma correction to a threshold matrix, then comparing the gray levels in the continuous-tone image with the corrected threshold values. The threshold matrix may be selected from a library of threshold matrices, and the inverse gamma correction applied by using a gamma correction table selected from a library of such tables. Alternatively, a library containing at least one corrected threshold matrix, to which the inverse gamma correction has already been applied, may be stored.

16 Claims, 14 Drawing Sheets

FIG. 12

| ROW\COLUMN | 1 | | | 4 | | | | 8 | | | | 12 | | | | 16 |
|---|---|---|---|---|---|---|---|---|---|---|---|---|---|---|---|---|
| 1 | 255 | 223 | 127 | 31 | 247 | 215 | 119 | 23 | 253 | 221 | 125 | 29 | 245 | 213 | 117 | 16 |
| | 159 | 191 | 95 | 63 | 151 | 183 | 87 | 55 | 157 | 189 | 93 | 61 | 149 | 181 | 85 | 21 |
| | 111 | 15 | 239 | 207 | 103 | 7 | 231 | 199 | 109 | 13 | 237 | 205 | 101 | 5 | 229 | 53 |
| 4 | 79 | 47 | 143 | 175 | 71 | 39 | 135 | 167 | 77 | 45 | 141 | 173 | 69 | 37 | 133 | 197 |
| | 243 | 211 | 115 | 19 | 251 | 219 | 123 | 27 | 241 | 209 | 113 | 17 | 249 | 217 | 121 | 165 |
| | 147 | 179 | 83 | 51 | 155 | 187 | 91 | 59 | 145 | 177 | 81 | 49 | 153 | 185 | 89 | 25 |
| | 99 | 3 | 227 | 195 | 107 | 11 | 235 | 203 | 97 | 1 | 225 | 193 | 105 | 9 | 233 | 57 |
| 8 | 67 | 35 | 131 | 163 | 75 | 43 | 139 | 171 | 65 | 33 | 129 | 161 | 73 | 41 | 137 | 201 |
| | 252 | 220 | 124 | 28 | 244 | 212 | 116 | 20 | 254 | 222 | 126 | 30 | 246 | 214 | 118 | 169 |
| | 156 | 188 | 92 | 60 | 148 | 180 | 84 | 52 | 158 | 190 | 94 | 62 | 150 | 182 | 86 | 22 |
| | 108 | 12 | 236 | 204 | 100 | 4 | 228 | 196 | 110 | 14 | 238 | 206 | 102 | 6 | 230 | 54 |
| 12 | 76 | 44 | 140 | 172 | 68 | 36 | 132 | 164 | 78 | 46 | 142 | 174 | 70 | 38 | 134 | 198 |
| | 240 | 208 | 112 | 16 | 248 | 216 | 120 | 24 | 242 | 210 | 114 | 18 | 250 | 218 | 122 | 166 |
| | 144 | 176 | 80 | 48 | 152 | 184 | 88 | 56 | 146 | 178 | 82 | 50 | 154 | 186 | 90 | 26 |
| | 96 | 1 | 224 | 192 | 104 | 8 | 232 | 200 | 98 | 2 | 226 | 194 | 106 | 10 | 234 | 58 |
| 16 | 64 | 32 | 128 | 160 | 72 | 40 | 136 | 168 | 66 | 34 | 130 | 162 | 74 | 42 | 138 | 202 |
| | | | | | | | | | | | | | | | | 170 |

FIG. 13

| ROW\COLUMN | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 255 | 249 | 151 | 30 | 255 | 242 | 143 | 22 | 255 | 248 | 150 | 28 | 254 | 240 | 140 | 20 |
| 2 | 192 | 222 | 108 | 70 | 180 | 216 | 99 | 60 | 189 | 220 | 105 | 68 | 177 | 214 | 96 | 57 |
| 3 | 131 | 14 | 254 | 234 | 118 | 7 | 253 | 227 | 127 | 13 | 254 | 232 | 115 | 5 | 252 | 226 |
| 4 | 90 | 49 | 168 | 209 | 81 | 39 | 159 | 201 | 88 | 47 | 166 | 207 | 78 | 37 | 157 | 199 |
| 5 | 254 | 238 | 137 | 18 | 255 | 246 | 148 | 26 | 254 | 236 | 134 | 16 | 255 | 244 | 145 | 24 |
| 6 | 174 | 213 | 94 | 54 | 186 | 219 | 103 | 65 | 171 | 211 | 92 | 52 | 183 | 218 | 101 | 62 |
| 7 | 113 | 3 | 251 | 225 | 124 | 11 | 253 | 230 | 110 | 1 | 251 | 223 | 121 | 9 | 253 | 229 |
| 8 | 76 | 35 | 155 | 197 | 85 | 44 | 163 | 205 | 73 | 33 | 153 | 194 | 83 | 42 | 161 | 203 |
| 9 | 255 | 247 | 149 | 27 | 254 | 239 | 139 | 19 | 255 | 249 | 150 | 29 | 254 | 241 | 142 | 21 |
| 10 | 188 | 220 | 104 | 66 | 176 | 213 | 95 | 56 | 190 | 221 | 106 | 69 | 179 | 215 | 97 | 58 |
| 11 | 126 | 12 | 253 | 231 | 114 | 4 | 252 | 225 | 129 | 14 | 254 | 233 | 117 | 6 | 252 | 227 |
| 12 | 86 | 45 | 164 | 206 | 77 | 36 | 156 | 198 | 89 | 48 | 167 | 208 | 79 | 38 | 158 | 200 |
| 13 | 254 | 235 | 132 | 15 | 255 | 243 | 144 | 23 | 254 | 237 | 136 | 17 | 255 | 245 | 146 | 25 |
| 14 | 170 | 210 | 91 | 50 | 182 | 217 | 100 | 61 | 173 | 212 | 93 | 53 | 185 | 218 | 102 | 64 |
| 15 | 109 | 1 | 250 | 222 | 120 | 8 | 253 | 228 | 111 | 2 | 251 | 224 | 123 | 10 | 253 | 230 |
| 16 | 72 | 32 | 152 | 193 | 82 | 41 | 160 | 202 | 74 | 34 | 154 | 195 | 84 | 43 | 162 | 204 |

METHOD AND APPARATUS FOR CONVERTING CONTINUOUS-TONE IMAGES TO BI-LEVEL IMAGES

BACKGROUND OF THE INVENTION

The present invention relates to a method and apparatus for converting continuous-tone images to bi-level images.

A known method of effecting this conversion simulates the gray scale of the continuous-tone image with local variations in the proportion of black and white picture elements or pixels in the bi-level image. This is typically done by using a threshold matrix, such as a dither matrix or a density-pattern matrix, to generate blocks of bi-level pixels. A dither matrix is a matrix of threshold values that are compared one-to-one with a block of continuous-tone pixels to generate a block of bi-level pixels. A density-pattern matrix is a matrix of threshold values that are compared with a single continuous-tone pixel to generate a block of bi-level pixels. Dither matrices are used in printers, copiers, facsimile machines, and other devices to convert continuous-tone images having comparatively high resolution. Density-pattern matrices are used are used to convert continuous-tone images having lower resolution.

Use of these methods alone, however, tends to produce a bi-level image that appears too dark. The reason is a non-linear relationship, known as a gamma curve, between perceived darkness and the actual density of black pixels in the bi-level image. Because of this relationship, the perceived darkness saturates, so that densities intended to represent different shades of dark gray look indistinguishably black.

The overly dark appearance and saturation can be avoided by adjusting the gray levels in the continuous-tone image according to the mathematical inverse of the gamma curve. Conventional image conversion is therefore a two-step process, comprising a gamma correction applied to the continuous-tone image, followed by the actual conversion from continuous-tone to bi-level form by dithering, density pattern generation, or a similar method.

A disadvantage of the conventional two-step conversion process is that it takes extra time and requires extra computing resources.

SUMMARY OF THE INVENTION

An object of the invention to convert a continuous-tone image to a bi-level image quickly.

Another object is to reduce the use of computing resources in converting a continuous-tone image to a bi-level image.

According to a first aspect of the invention, a continuous-tone image is converted to a bi-level image by the steps of:

storing a first threshold matrix;

applying an inverse gamma correction to the first threshold matrix, thereby obtaining a second threshold matrix; and comparing the gray levels in the continuous-tone image with the corrected threshold values.

According to a second aspect of the invention, a continuous-tone image is converted to a bi-level image by the steps of:

storing at least one corrected threshold matrix having threshold values related by an inverse gamma correction to the threshold values in a conventional threshold matrix; and comparing the gray levels in the continuous-tone image with the corrected threshold values.

The invention also provides apparatus for converting images by the above methods.

BRIEF DESCRIPTION OF THE DRAWINGS

In the attached drawings:

FIG. 12 illustrates a conventional dither matrix;

FIG. 13 illustrates a gamma-corrected dither matrix;

DETAILED DESCRIPTION OF THE INVENTION

Figure 3:
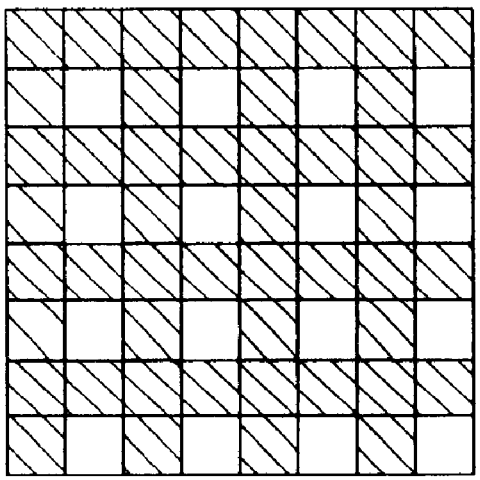
FIGS. 1, 2, and 3 illustrate the representation of different gray levels by patterns of black and white pixels.

Embodiments of the invention will be described with reference to the attached drawings, in which like parts are indicated by like reference characters.

First, a brief description will be given of the bi-level representation of continuous tones.

Figure 2:
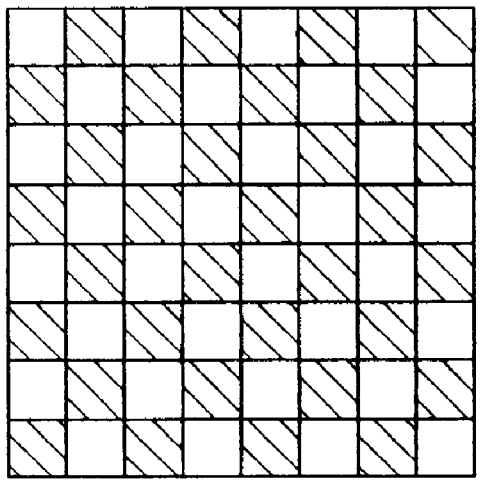
Figure 1:
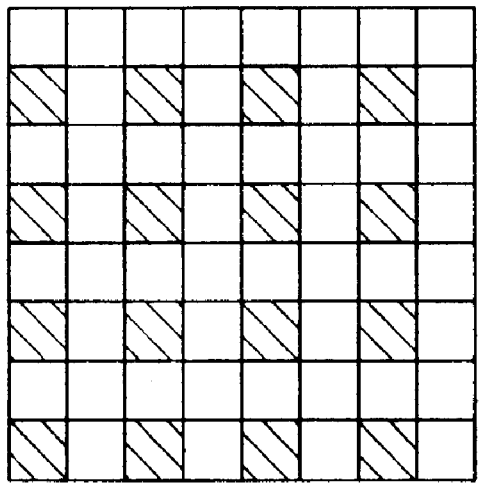

In FIG. 1, white squares represent white pixels, and shaded squares represent black pixels. The entire eight-by-eight block of pixels has a density of 25% and, when printed, appears as a small gray area. FIG. 2 shows a similar eight-by-eight block with a density of 50%, which appears darker gray. FIG. 3 shows an eight-by-eight block with a density of 75%, which appears still darker. By varying the proportion of black pixels, with an eight-by-eight block size, it is possible to express a gray scale having sixty-four gray levels.

Figure 4:
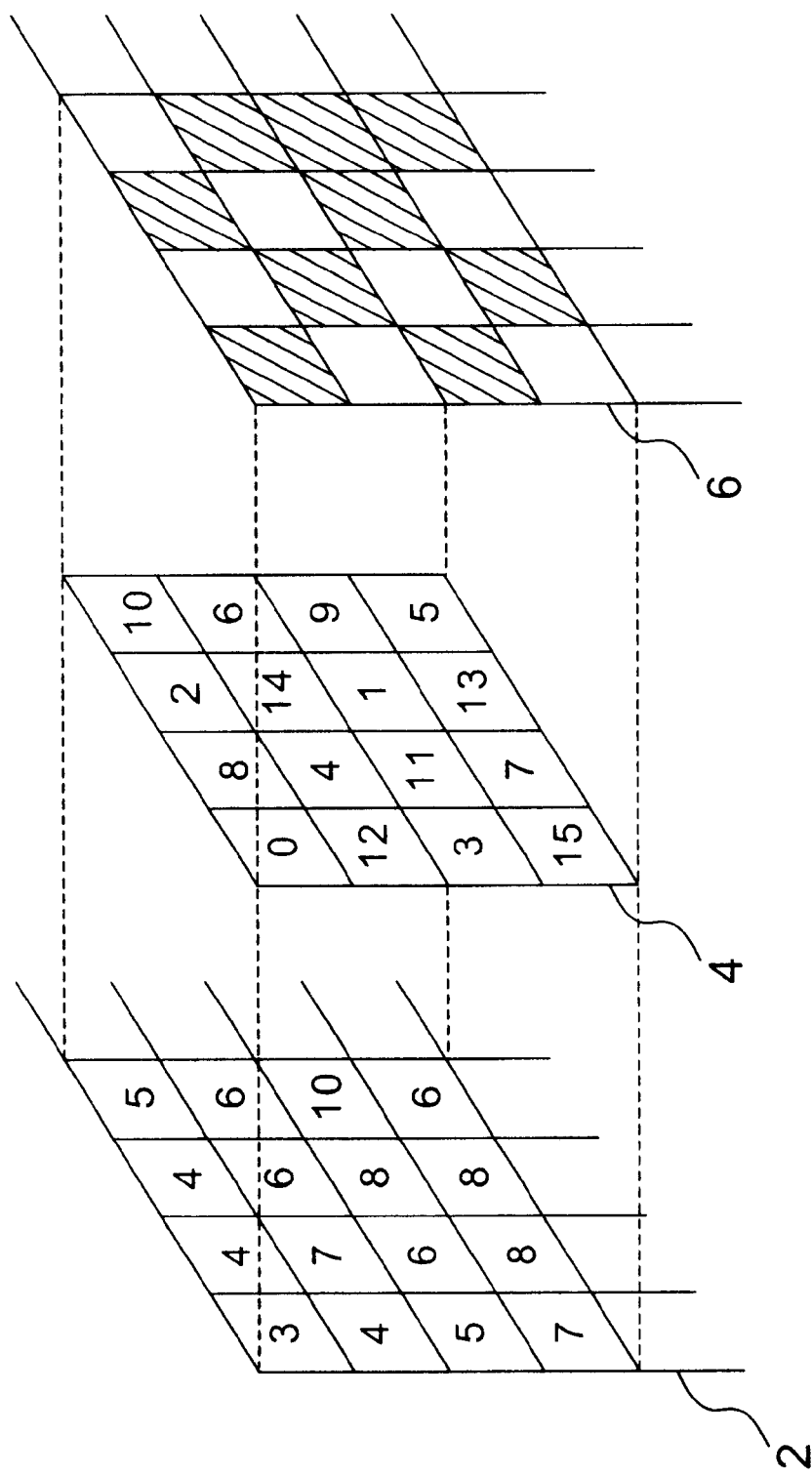
FIG. 4 illustrates the dithering process.

FIG. 4 illustrates the dithering method of converting a continuous-tone image to a bi-level image, using a four-by-four block size and a sixteen-level gray scale for simplicity. In the input continuous-tone image 2, gray levels are represented by values from zero to fifteen, with higher values indicating darker shades of gray. Threshold values from zero to fifteen are distributed in a four-by-four dither pattern or dither matrix 4 of the conventional type known as a Bayer's matrix, in which each threshold value appears once. The input image 2 is also divided into four-by-four blocks, each of which is matched against the dither matrix 4. Pixels with values less than the corresponding threshold value in the dither matrix 4 become white pixels in the output image 6. Pixels with values equal to or greater than the corresponding threshold value in the dither matrix 4 become black pixels in the output image 6.

Figure 5:
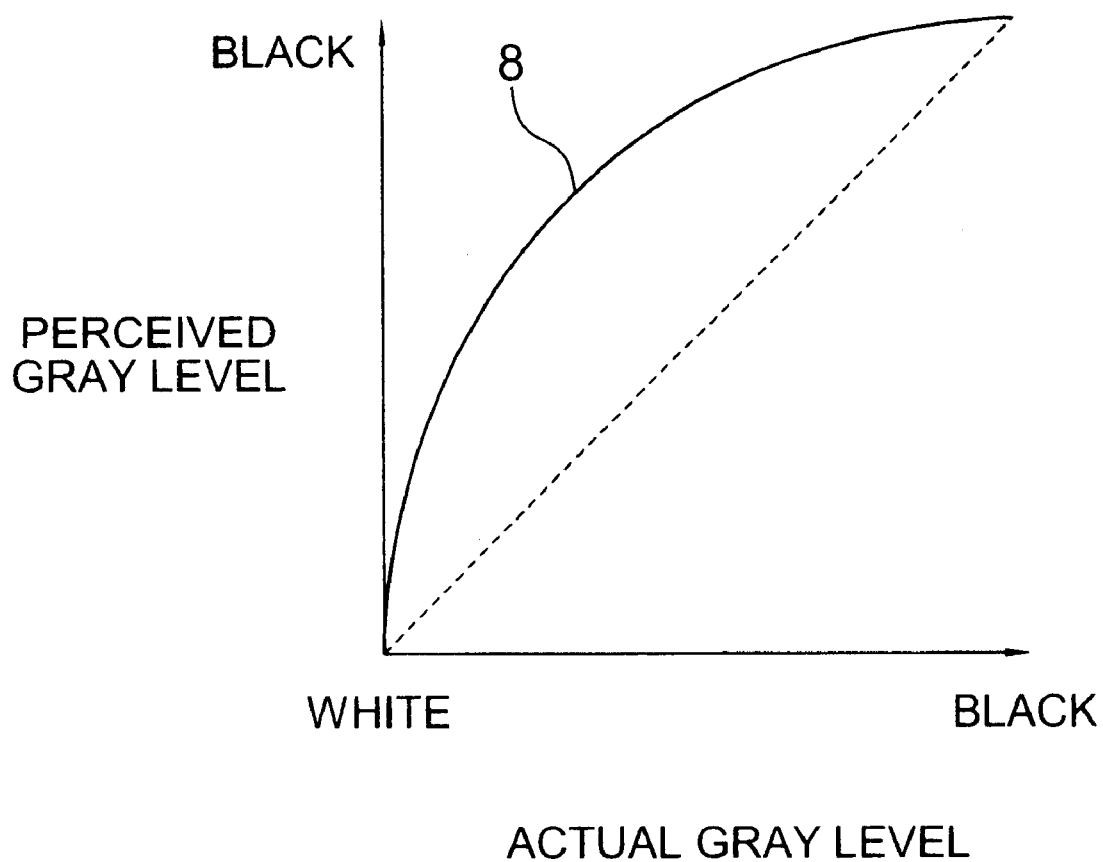
FIG. 5 illustrates a gamma curve.

FIG. 5 illustrates the general shape of a gamma curve 8, showing the actual gray level represented in the bi-level image on the horizontal axis, and the perceived gray level on the vertical axis. The actual gray level refers to the actual density of black pixels, e.g. 25% in FIG. 1. As noted earlier, the gamma curve is non-linear, and the printed image appears saturated, thus indistinguishable from black, when the actual gray level is somewhat less than 100%.

Figure 6:
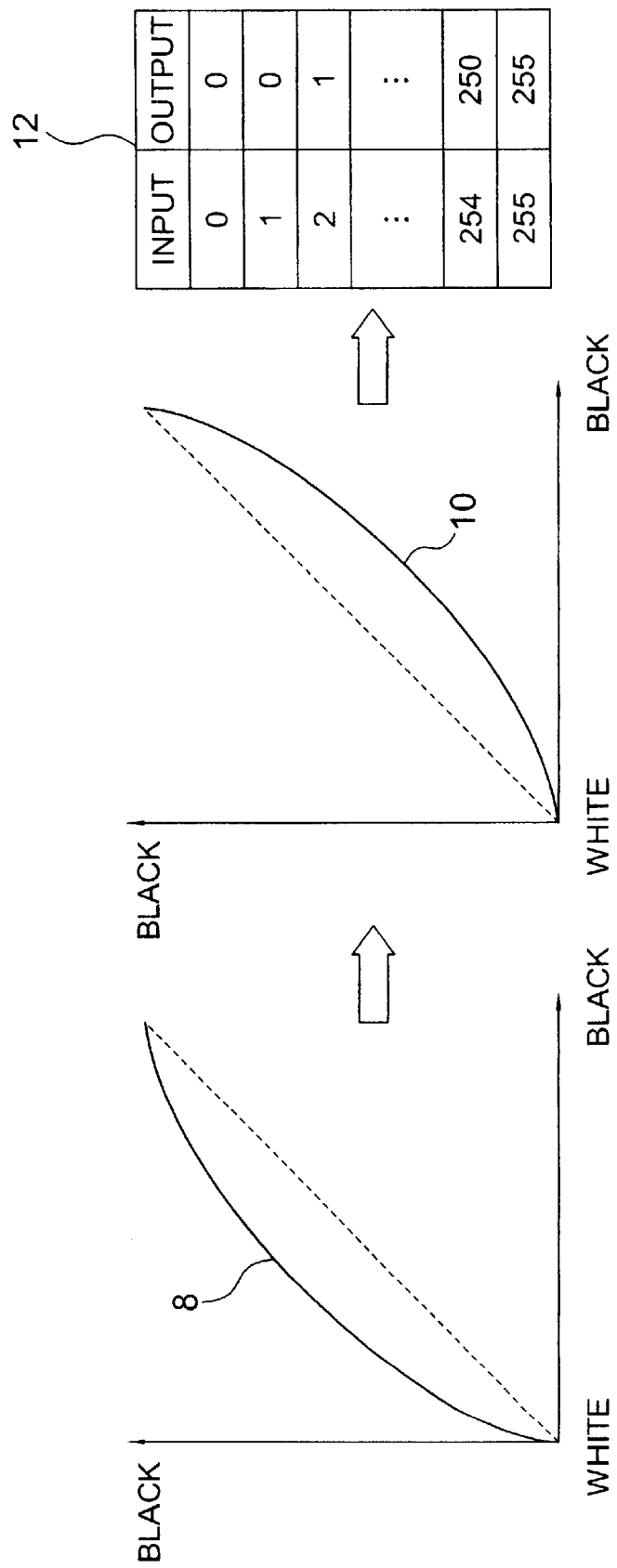
FIG. 6 shows a gamma curve, an inverse gamma curve, and a gamma correction table.

FIG. 6 illustrates a gamma curve 8, an inverse gamma curve 10 derived from the gamma curve 8, and a gamma correction table 12 derived from the inverse gamma curve 10. The gamma correction table 12 has input pixel values in the left-hand column, and output pixel values in the right-hand column. Use of the gamma correction table 12 reduces the gamma correction process to a simple table look-up, not requiring mathematical computations.

Figure 7:
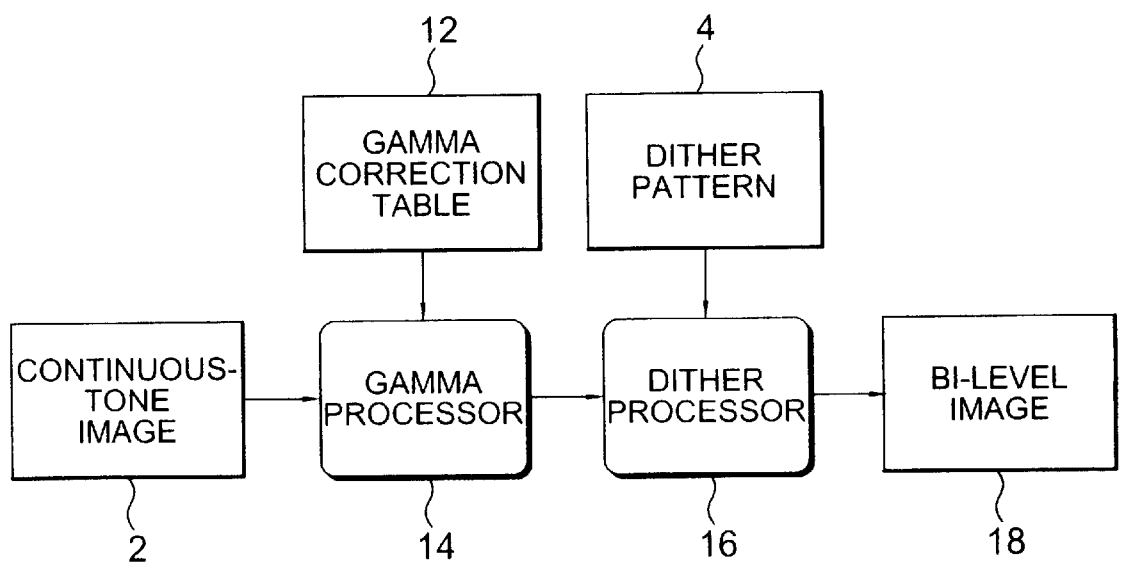
FIG. 7 is a block diagram illustrating a conventional system for converting a continuous-tone image to a bi-level image.

FIG. 7 shows a conventional image-processing system that carries out the gamma correction and dithering processes separately. A continuous-tone image 2 is received by a gamma processor 14, which converts each input pixel value to the corresponding output pixel value given in the gamma correction table 12. The corrected continuous-tone image is passed to a dither processor 16, which uses a dither matrix 4 to carry out the thresholding process illustrated in FIG. 4. When printed, the resulting bi-level image 18 appears to have the correct gray scale.

Since each input pixel must be first gamma-corrected, then compared with a dither threshold, the total amount of computation can be estimated as the number of pixels in the input image, multiplied by the computation required for one table look-up and one threshold comparison.

Figure 8:
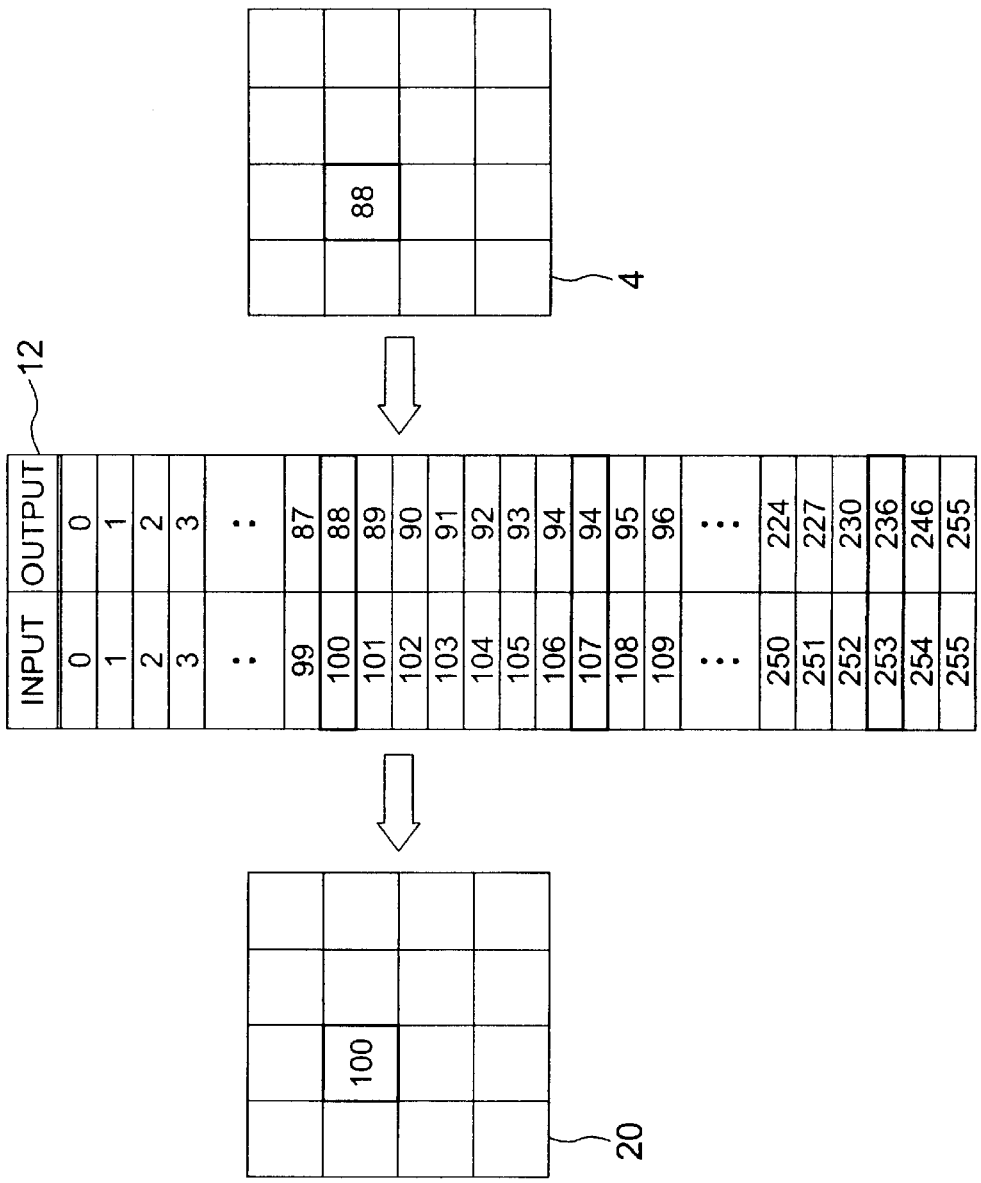
FIG. 8 illustrates the generation of a gamma-corrected dither matrix according to the present invention.

FIG. 8 illustrates a step in a first embodiment of the present invention, in which a conventional dither matrix 4 and gamma correction table 12 are used to generate a gamma-corrected dither matrix 20. The gray scale has two hundred fifty-six gray levels, from zero (white) to two hundred fifty-five (black). The dither matrix 4 is a four-by-four matrix with threshold values in the range from zero to two hundred fifty-five. The threshold values in the dither matrix 4 are compared with the output values in the gamma correction table 12, and the corrected dither matrix 20 is filled with corresponding values from the input side of the gamma correction table 12. For example, the threshold value eighty-eight in the dither matrix 4 becomes one hundred in the corrected dither matrix 20.

Due to the non-linearity of the gamma curve, there is not a one-to-one correspondence between the input values and output values in the gamma correction table 12. For example, the input values one hundred six and one hundred seven both correspond to the same output value (ninety-four). A threshold value of ninety-four in the original dither matrix 4 could ambiguously become either one hundred six or one hundred seven in the corrected dither matrix 20. Furthermore, there is no input value corresponding to output values from two hundred forty-seven to two hundred fifty-four. A threshold value of, say, two hundred fifty in the dither matrix 4 has to become either two hundred fifty-four or two hundred fifty-five, but it is not clear which of these two values should be placed in the corrected dither matrix 20.

In the present embodiment, these ambiguities are dealt with by the following rules, in which n designates a threshold value in the corrected dither matrix 20 or an input value in the gamma correction table 12, t designates a threshold value in the dither matrix 4 or an output value in the gamma correction table 12, and LUT(n) designates the output value given by the gamma correction table 12 for the input value of n.

Rule one: A threshold value (t) of zero in the dither matrix 4 is converted to a threshold value (n) of zero in the corrected dither matrix 20.

Rule two: A non-zero threshold value (t) is converted to a threshold value (n) such that $$LUT(n-1) < t \leq LUT(n)$$

These rules determine a unique value of n for every value of t. For example, ninety-four (t=94) is converted uniquely to one hundred six (n=106), and two hundred fifty (t=250) is converted uniquely to two hundred fifty-five (n=255).

Once the process of generating the corrected dither matrix 20 has been carried out, the corrected dither matrix 20 can be used to convert a continuous-tone image directly to a gamma-corrected bi-level image, in a single step. The total amount of computation can be estimated as the number of pixels in the input image multiplied by the computation required for one threshold comparison, plus the amount of computation required to generate the gamma-corrected dither matrix 20. This latter amount of computation is normally much less than the amount that would be required for gamma correction of an entire continuous-tone image, because the dither matrix 4 is normally much smaller than the input image. Moreover, the same corrected dither matrix 20 can be used to convert multiple images, further reducing the computational cost per image. The invented conversion method is therefore more efficient than the conventional two-step method.

Figure 9:
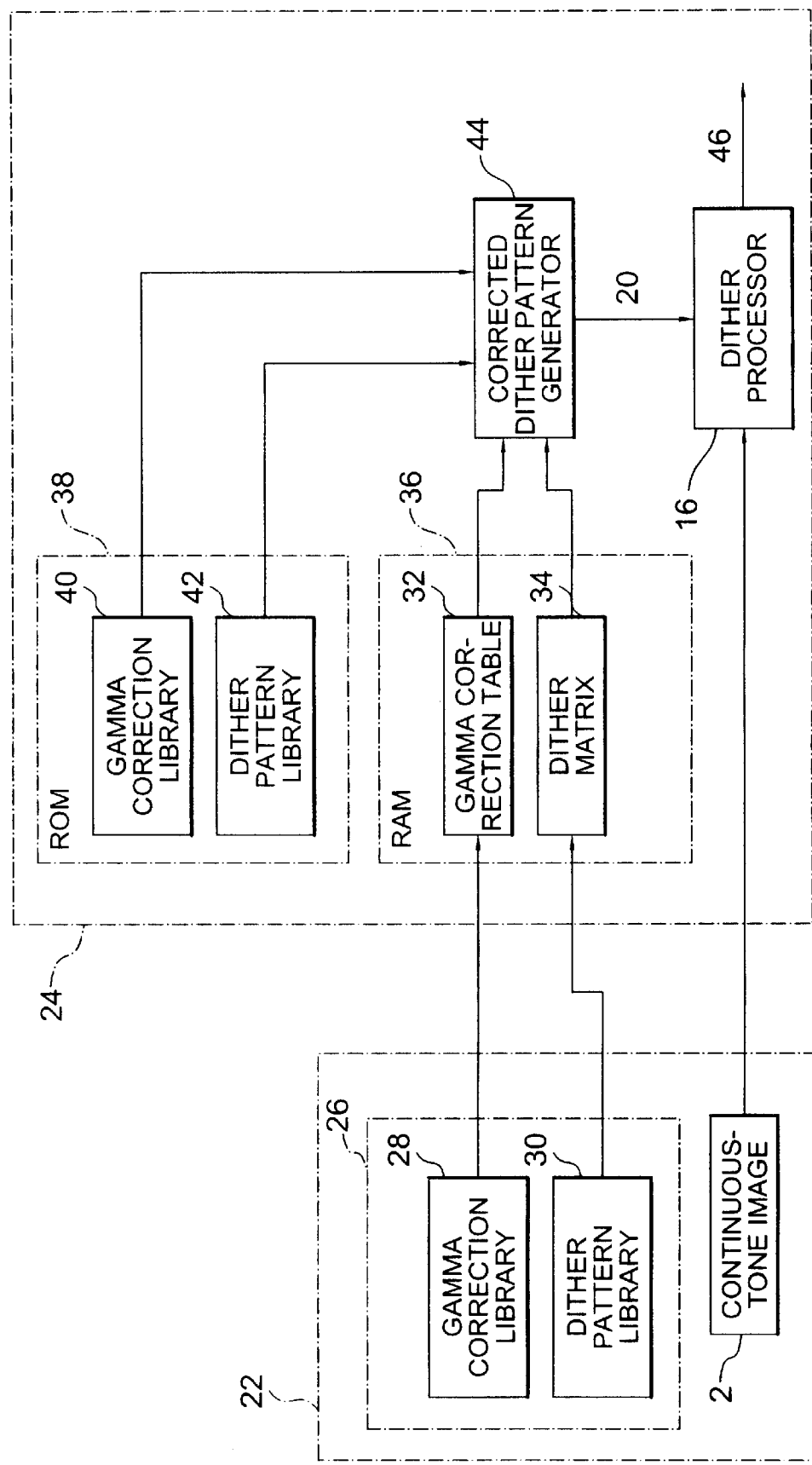
FIG. 9 is a block diagram illustrating a system for converting a continuous-tone image to a bi-level image according to a first embodiment of the invention.

FIG. 9 illustrates the relevant functional blocks of a host device 22 and a printer 24 illustrating the first embodiment. The host device 22 and printer 24 are connected by a cable or other link, permitting data to be transferred from the host device 22 to the printer 24 as indicated by the arrows.

The host device 22 is, for example, a computer running an operating system and application software that generates or acquires a continuous-tone image 2 in which the pixels have gray levels from zero (white) to N (black), where N is an integer greater than one. The number of gray levels is N+1. Continuous-tone images can be acquired from, for example, a scanner or other external device (not visible).

The host device 22 also has a memory unit 26, such as a magnetic disk or a non-volatile semiconductor memory, in which a gamma correction library 28 and a dither pattern library 30 are stored. The gamma correction library 28 comprises a plurality of gamma correction tables, which can be selected according to designated printing conditions, or according to properties of the continuous-tone image 2. The dither pattern library 30 comprises a plurality of dither matrices, which can be similarly selected. When necessary, a selected gamma correction table 32 and dither matrix 34 are transferred to a random-access memory (RAM) 36 in the printer 24.

The printer 24 also has a read-only memory (ROM) 38 with a gamma correction library 40 and a dither pattern library 42. These libraries 40, 42 are generally similar to the libraries 28, 30 in the printer 24, storing a plurality of gamma correction tables and dither matrices which can be selected according to printer settings, or according to properties of the continuous-tone image 2. The gamma correction table selected from the printer's bi-level image 46 and the dither matrix selected from the printer's dither pattern library 42 function as a default gamma correction table and a default dither matrix, used when no gamma correction table or no dither matrix is supplied from the host device 22.

The dither matrices stored in the dither pattern libraries 30, 42 are, for example, Bayer's matrices, or other dither matrices of the type conventionally used to convert gamma-corrected continuous-tone images to bi-level images.

Another element of the printer 24 is a corrected dither pattern generator 44 that reads the gamma correction table 32 and dither matrix 34 from the RAM 36, and generates from them a corrected dither matrix 20 by applying rules one and two given above. If the host device 22 has not transferred a gamma correction table 32 or dither matrix 34 into the RAM 36, the corrected dither pattern generator 44 reads the default gamma correction table or default dither matrix from the ROM 38.

The printer 24 also has a dither processor 16 that processes the continuous-tone image 2, which is transferred from the host device 22, according to the corrected dither matrix 20 generated by the corrected dither pattern generator 44. Specifically, the dither processor 16 divides the continuous-tone image 2 into blocks of the same size as the corrected dither matrix 20, compares each pixel in each block with the corresponding threshold value in the corrected dither matrix 20, generates a white output pixel if the input pixel value is less than the threshold value, and generates a black output pixel if the input pixel value is equal to or greater than the threshold value. The output pixels form a bi-level image 46, which is printed by a printing mechanism (not visible) in the printer 24.

The dither processor 16 and corrected dither pattern generator 44 are, for example, software modules executed by a microprocessor (not visible) in the printer 24.

Next, the operation of the apparatus in FIG. 9 will be described.

Figure 10:
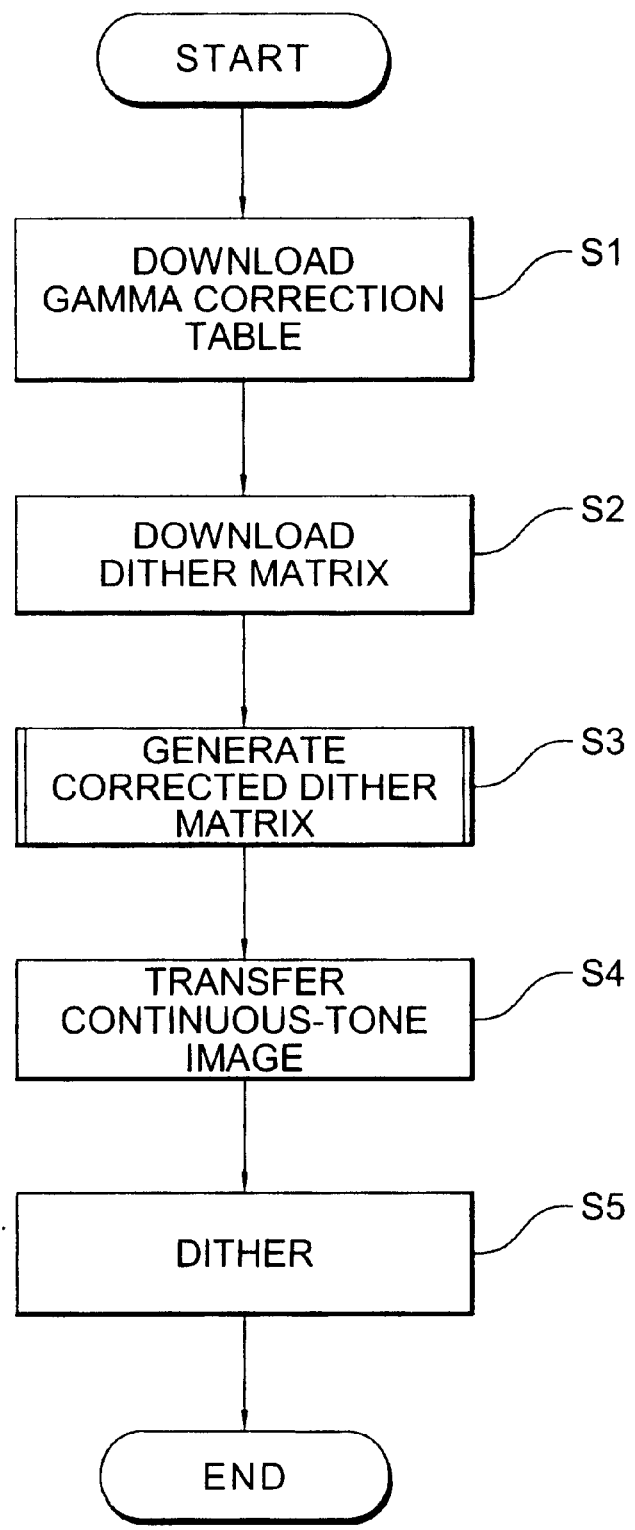
FIG. 10 is a flowchart illustrating the operation of the system in FIG. 9.

FIG. 10 illustrates the general flow of the process when the corrected dither matrix 20 is generated from a gamma correction table 32 and dither matrix 34 supplied from the host device 22. First, a gamma correction table 32 is read from the gamma correction library 28 in the host device 22, downloaded to the printer 24, and stored in the printer's RAM 36 (step SI). Next, a dither matrix 34 is read from the dither pattern library 30 in the host device 22, downloaded to the printer 24, and similarly stored in the RAM 36 (step S2). The corrected dither pattern generator 44 generates the corrected dither matrix 20 from the gamma correction table 32 and dither matrix 34 stored in the RAM 36 (step S3). Next, the continuous-tone image 2 is transferred from the host device 22 to the printer 24 (step S4). In the printer 24, the dither processor 16 divides the continuous-tone image 2 into blocks, compares each block with the corrected dither matrix 20, and thereby generates the bi-level image 46 (step S5).

Figure 11:
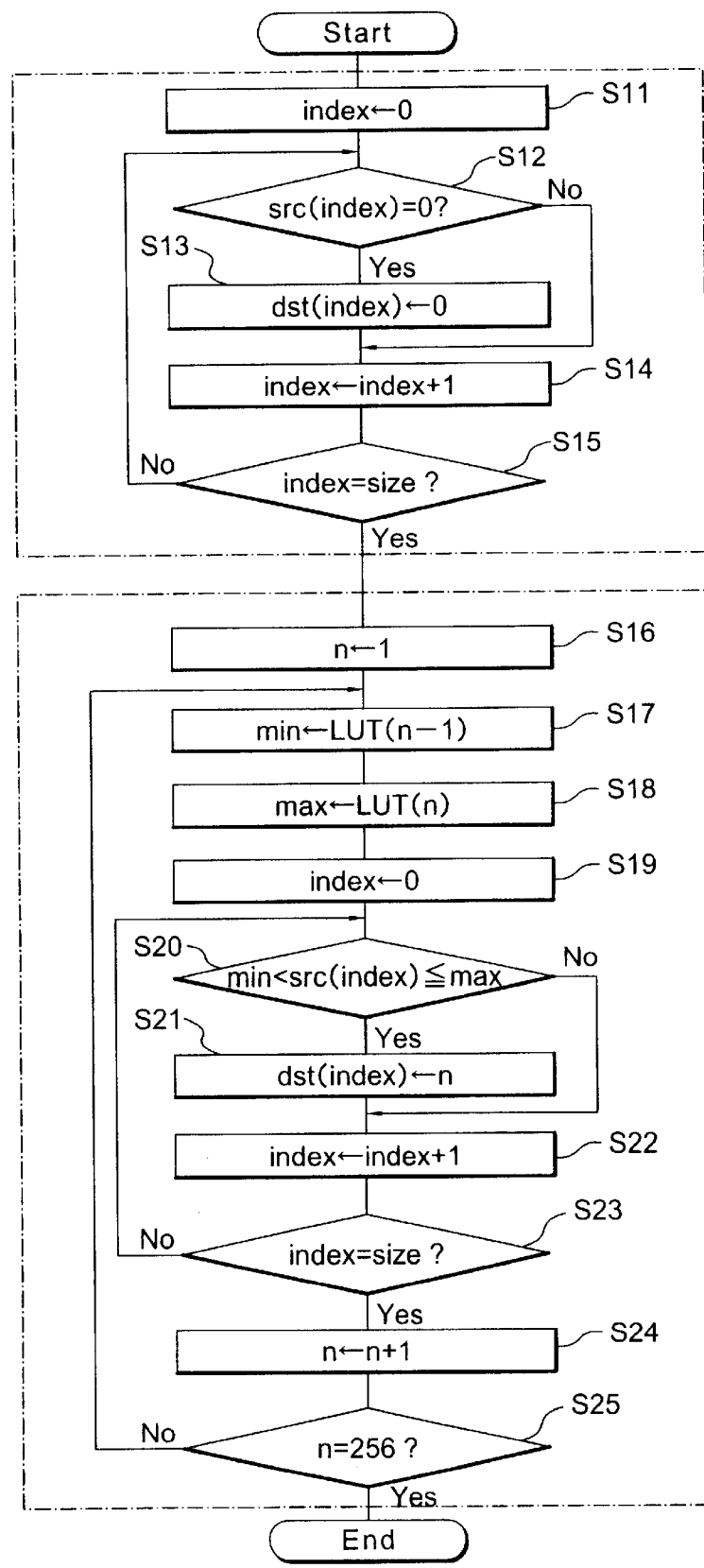
FIG. 11 is a more detailed flowchart illustrating the procedure for generating the gamma-corrected dither matrix.

FIG. 11 illustrates the step of generating the corrected dither matrix 20 (step S3) in more detail. The gamma correction table 32 is assumed to be the gamma correction table partly shown in FIG. 8. As above, n denotes an input value in the gamma correction table, and LUT(n) denotes the corresponding output value. The dither matrix 34 and corrected dither matrix 20 are assumed to be sixteen-by-sixteen matrices, thus having a size of two hundred fiftysix. The notation 'size' in FIG. 11 denotes this size (256). The other notation used in FIG. 11 has the following meanings.

'max' denotes an output value LUT(n) in the gamma correction table 32.

'min' denotes the preceding output value LUT(n−1).

'index' identifies the positions of the threshold values in the dither matrix 34 and corrected dither matrix 20. These positions are numbered from zero to 'size' less one (0 to 255).

'src(index)' denotes the threshold at the designated (index) position in the uncorrected dither matrix 34.

'dst(index)' denotes the threshold at the designated (index) position in the corrected dither matrix 20.

Steps S11 to S15 in FIG. 11 implement rule one. Steps S16 to S25 implement rule two.

First the index value is set to zero (step S11), and the threshold value src(index) in the dither matrix 34 is tested (step S12). If this threshold value is zero, the corresponding threshold dst(index) in the corrected dither matrix 20 is set to zero (step S13). If src(index) is not zero, then step S13 is skipped.

After step S12 or S13, the index value is incremented (step S14) and compared with the size of the dither matrix 34 (step S15). If the index value is not equal to the size, the process returns to step S12 to test the next threshold value in the dither matrix 34. Steps S12 to S15 form a first loop that finds all threshold values equal to zero in the dither matrix 34, and sets the corresponding threshold values to zero in the corrected dither matrix 20.

When the index value reaches the size of the dither matrix 34, the process exits the first loop. Next, the variable n is set to one (step S16), the value LUT(n−1) is assigned to the variable min (step S17), the value LUT(n) is assigned to the variable max (step S18), and the index value is reset to zero (step S19). Following these preparations, steps S20 to S23 are carried out.

These steps S20 to S23 form a second loop, similar in structure to the first loop, in which every threshold value src(index) in the dither matrix 34 is compared with min and max, and the current value of n is assigned as the threshold value dst(index) in the corrected dither matrix 20 if $$\mathrm{min} < src(\mathrm{index}) \leq \mathrm{max},$$

that is, if $$LUT(n-1) < src\ (\mathrm{index}) \leq LUT(n).$$

The second loop finds all threshold values in the dither matrix 34 that lie in the range given by the inequality above, and assigns n as the corresponding threshold value for each in the corrected dither matrix 20.

When the index value reaches the size of the dither matrix 34, the process exits the second loop, the value of n is incremented (step S24), and the incremented value is compared with two hundred fifty-six (step S25), which is one more than the maximum possible threshold value (255). If n is not equal to two hundred fifty-six, the process returns to step S17. Steps S17 to S25 form a third loop that executes the second loop for all possible threshold values greater than zero.

The process ends when the second loop has been carried out for the maximum possible threshold value (n=255), and n is found equal to two hundred fifty-six in step S25.

As an illustration of the operation of the second loop, when n is equal to one hundred six (n=106), min=LUT(105)=93 max=LUT(106)=94

The only threshold value (t) in the range min<t≦max is ninety-four. If any of the threshold value in the dither matrix 34 is equal to ninety-four, the corresponding threshold value in the corrected dither matrix 20 becomes one hundred six.

As another illustration, when n is equal to one hundred seven (n=107), min=LUT(106)=94
max=LUT(107)=94

No threshold value (t) can satisfy the inequality min<t≦max in this case. If a threshold value of ninety-four occurs in the gamma correction table 32, the corresponding threshold value in the corrected dither matrix 20 remains one hundred six, and is not changed to one hundred seven.

As still another illustration, when n is equal to two hundred fifty-three (n=253), min=LUT(252)=230
max=LUT(253)=236

All threshold values (t) from two hundred thirty-one to two hundred thirty-six (230<t≦236) in the dither matrix 34 become threshold values of two hundred fifty-three in the corrected dither matrix 20.

FIG. 12 shows an example of threshold values (t) in the dither matrix 34. This dither matrix 34 is a modification of the sixteen-by-sixteen Bayer's matrix, in which the zero threshold has been replaced by a threshold value of 'one,' and each threshold value greater than one appears just once. FIG. 13 shows the corrected dither matrix 20.

To demonstrate that the invented one-step conversion process gives the same result as the conventional two-step process, consider an input pixel with a gray level of one hundred seven disposed at a position corresponding to row ten, column eleven of the dither matrix. Under the conventional method, the gray level of this input pixel is first corrected to ninety-four by the gamma correction table 12 in FIG. 8, then compared with the threshold value (94) at row ten, column eleven in FIG. 12, producing a black output pixel. By the invented method, the input gray level (107) is compared directly with the threshold value (106) at row ten, column eleven in FIG. 13, again producing a black output pixel.

If an input pixel with the same gray level (107) is disposed at a position corresponding to row two, column three, then by the conventional method, the corrected gray level (94) is compared with the threshold value (95) in FIG. 12, producing a white output pixel. By the invented method, the original gray level (107) is compared directly with the threshold (108) in FIG. 13, again producing a white output pixel.

Similarly, if an input pixel with a gray level of two hundred fifty-three is compared with the threshold in row eleven, column three, the conventional method corrects the gray level to two hundred thirty-six, and compares the corrected value (236) with the threshold (236) in FIG. 12, producing a black output pixel. The invented method compares the original gray level (253) directly with the threshold value (253) in FIG. 13, again producing a black output pixel.

If this input pixel is located at a position corresponding to row three, column eleven, the conventional method compares the corrected gray level (236) with the threshold value (237) in FIG. 12, producing a white output pixel. The invented method compares the original gray level (253) with the threshold (254) in FIG. 13, again producing a white output pixel.

An exhaustive discussion (omitted) of all possible input gray levels and all positions in the dither matrix would confirm that the invented method always gives the same result as the conventional method, while reducing the conventional two-step process to a single step. More accurately, the invention reduces the conventional step of applying a gamma correction to an entire input image to the shorter step of applying an inverse gamma correction to a dither matrix.

By using a gamma correction table to generate the corrected dither matrix 20, the corrected dither pattern generator 44 not only assures that the corrected dither matrix 20 gives the correct conversion result, but also avoids the need to compute the inverse gamma correction mathematically.

Storing libraries of gamma correction tables and dither matrices in both the host device 22 and the printer 24 is efficient. Frequently used gamma correction tables and dither matrices are preferably stored in the printer 24, so that they do not have to be transferred from the host device 22. Infrequently-used gamma correction tables and dither matrices are preferably stored in the host device 22 and downloaded as necessary, so that they do not take up space in the printer's ROM 38.

The invention can be practiced, however, with gamma correction tables and dither matrices stored only in the printer's ROM 38, or only in the memory unit 26 of the host device 22.

As another variation, the procedure in FIG. 11 can be shortened by skipping steps S19 to S23 if the min and max value produced in steps S17 and S18 are equal.

Figure 14:
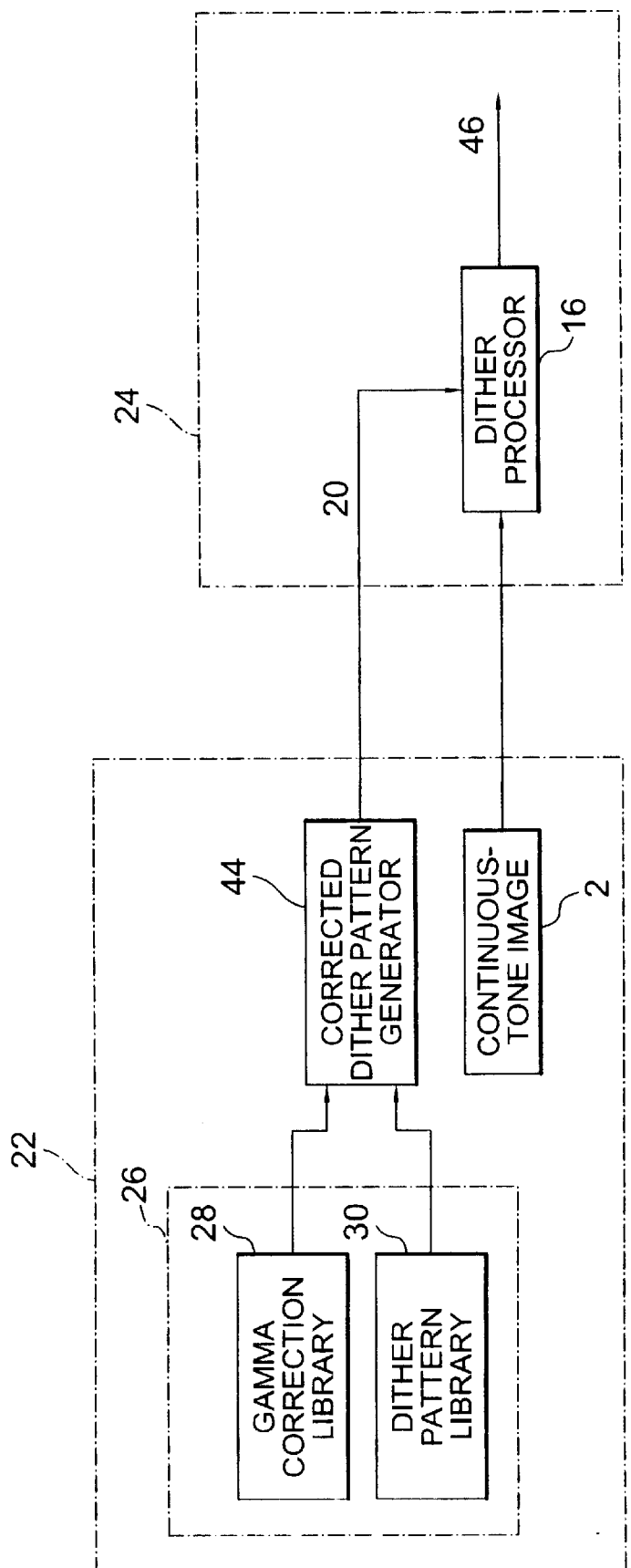
FIG. 14 is a block diagram illustrating a variation of the system in FIG. 9.

FIG. 14 illustrates a variation in which the corrected dither pattern generator 44 is disposed in the host device 22. The corrected dither pattern generator 44 selects a gamma correction table from the gamma correction library 28 and a dither matrix from the dither pattern library 30, generates a corrected dither matrix 20, and downloads the corrected dither matrix 20 to the dither processor 16 in the printer 24. The dither processor 16 uses the downloaded dither matrix 20 to convert the continuous-tone image 2 to a bi-level image 46. This variation enables the amount of memory and software in the printer 24 to be reduced, thereby reducing the cost of the printer 24.

Figure 15:
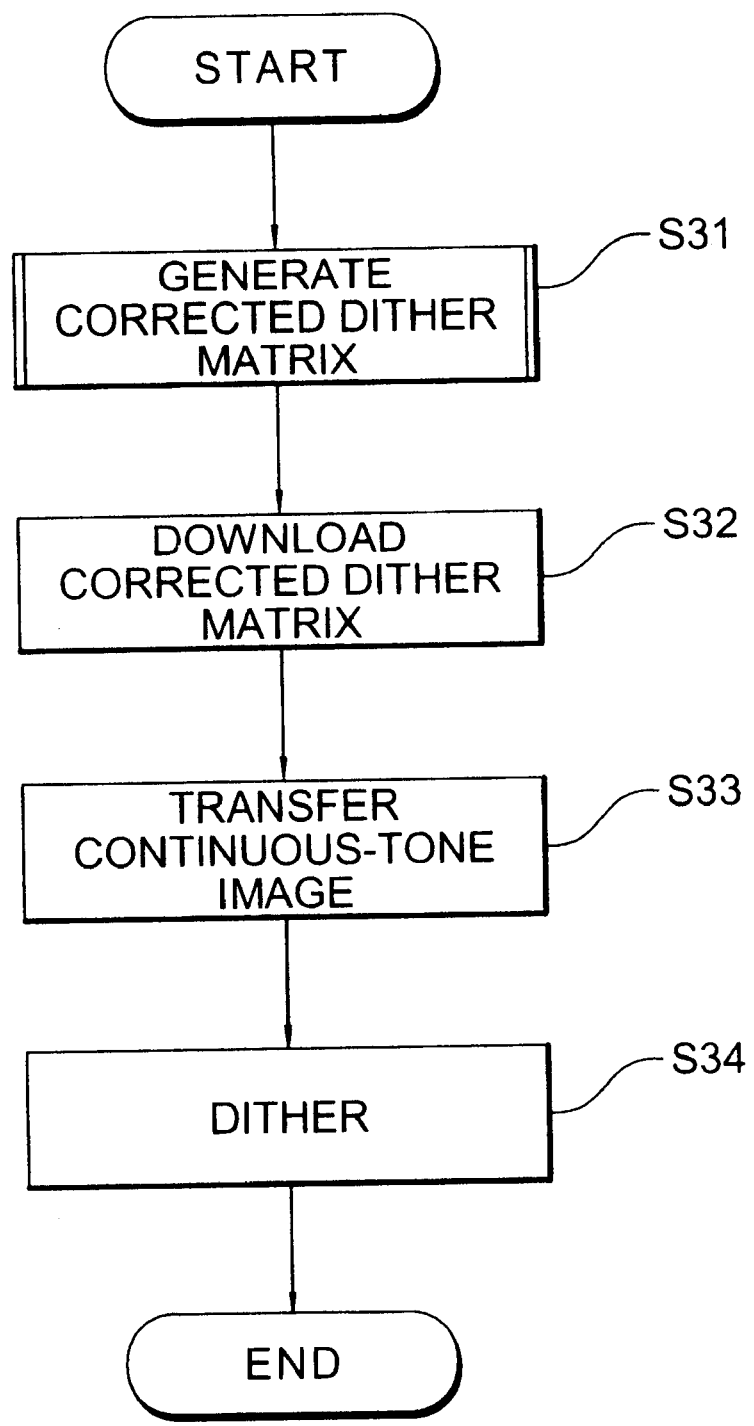
FIG. 15 is a flowchart illustrating the operation of the system in FIG. 14.

FIG. 15 illustrates the operation of this variation. First, the corrected dither pattern generator 44 generates a gamma-corrected dither matrix 20 by the procedure described above (step S31), and downloads the corrected dither matrix 20 to the printer 24 (step S32). Next, the continuous-tone image 2 is transferred from the host device 22 to the printer 24 (step S33) and converted to a bi-level image by dithering (step S34), using the downloaded dither matrix 20.

In a further variation, both the corrected dither pattern generator 44 and the dither processor 16 are disposed in the host device 22, which converts the continuous-tone image 2 to a bi-level image and transfers the bi-level image to the printer 24. This variation further reduces the cost of the printer 24, and enables the host device 22 to print continuous-tone images on any printer, regardless of whether or not the printer itself is equipped to convert the images to bi-level images.

Conversely, if the printer 24 has a dither processor 16, a corrected dither pattern generator 44, and a gamma correction library 40 and dither pattern library 42, it can print continuous-tone images regardless of whether the host device 22 has a gamma correction library 28 and dither pattern library 30. The gamma correction library 28 and dither pattern library 30 in the host device 22 can be eliminated to reduce the cost of the host device 22.

Figure 16:
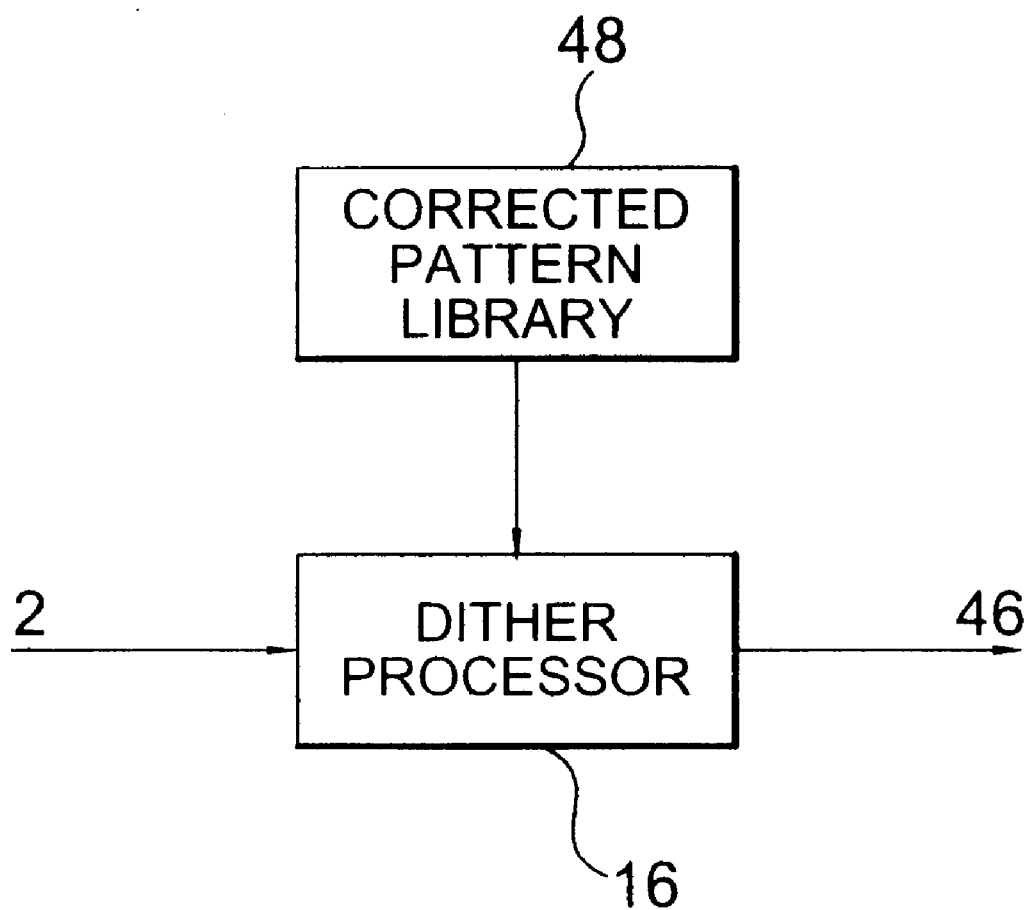
FIG. 16 is a block diagram illustrating a system for converting a continuous-tone image to a bi-level image according to second embodiment of the invention.

FIG. 16 illustrates a second embodiment of the invention. This embodiment comprises the dither processor 16 of the first embodiment, and a corrected pattern library 48. The corrected pattern library 48 comprises a plurality of gamma-corrected dither matrices stored on a magnetic disk, for example, or in a non-volatile semiconductor memory. The gamma-corrected dither matrices are generated in advance, e.g. by the procedure described above, from various possible combinations of conventional gamma correction tables and conventional dither matrices.

The dither processor 16 receives an input continuous-tone image 2, selects one of the gamma-corrected dither matrices stored in the corrected pattern library 48, and uses the selected matrix to convert the input image 2 to a bi-level image 46.

By generating the gamma-corrected dither matrices in advance, the second embodiment eliminates the need to generate a new gamma-corrected dither matrix before converting an image. Depending on the number and size of the patterns stored in the corrected pattern library 48, the second embodiment may also require less storage space than was required for the gamma correction libraries and dither pattern libraries in the first embodiment. The second embodiment accordingly operates faster than the first embodiment, and may also operate more economically.

In the description above, the minimum gray level (zero) was white and the maximum gray level was black, but the invention can of course by practiced when these values are reversed, so that the minimum is black and the maximum white.

The invention can also be practiced with density patterns instead of dither patterns, or with any conversion method that uses a threshold matrix with fixed threshold values.

The dither processor 16 and corrected dither pattern generator 44 have been described as software modules, but the invention can also be practiced by implementing these functions in hardware, for very-high-speed conversion.

Those skilled in the art will recognize that further variations are possible within the scope claimed below.

What is claimed is:

1. A method of converting a continuous-tone image having more than two gray levels to a bi-level image having only two gray levels, comprising the steps of:
   (a) storing at least one first threshold matrix with a plurality of threshold values;
   (b) applying an inverse gamma correction to the threshold values in said first threshold matrix, thereby obtaining a second threshold matrix with a plurality of corrected threshold values; and
   (c) comparing the gray levels in said continuous-tone image with said corrected threshold values, thereby generating said bi-level image.

2. The method of claim 1, wherein said first threshold matrix is a dither matrix.

3. The method of claim 1, wherein said first threshold matrix is a density pattern matrix.

4. The method of claim 1, wherein said step (a) stores a plurality of first threshold matrices with different threshold values, further comprising the step of:
   (d) selecting one of said first threshold matrices for use in said step (b).

5. The method of claim 1, wherein said step (b) further comprises the steps of:
   (e) storing at least one gamma correction table giving a corrected gray level LUT(n) for each gray level n from zero to a maximum gray level; and
   (f) for each non-zero threshold value t in said first threshold matrix, generating a corrected threshold value n in said second threshold matrix, such that $$LUT(n-1) < t \leq LUT(n).$$

6. The method of claim 5, wherein said step (e) stores a plurality of mutually differing gamma correction tables, further comprising the step of:
   (g) selecting one of said gamma correction tables for use in said step (f).

7. An apparatus for converting a continuous-tone image having more than two gray levels to a bi-level image having only two gray levels, comprising:

a corrected dither pattern generator applying an inverse gamma correction to a first threshold matrix having a plurality of threshold values, thereby obtaining a second threshold matrix with corrected threshold values; and a dither processor, coupled to said corrected dither pattern generator, comparing the gray levels in said continuous-tone image with said corrected threshold values, thereby generating said bi-level image.

8. The apparatus of claim 7, wherein said first threshold matrix is a dither matrix.

9. The apparatus of claim 7, wherein said first threshold matrix is a density pattern matrix.

10. The apparatus of claim 7, further comprising a dither pattern library storing a plurality of threshold matrices, from which said corrected dither pattern generator selects said first threshold matrix.

11. The apparatus of claim 7, wherein said corrected dither pattern generator uses a gamma correction table giving a corrected gray level LUT(n) for each gray level n from zero to a maximum gray level, and converts each non-zero threshold value t in said first threshold matrix to a corrected threshold value n in said second threshold matrix, such that $$LUT(n-1) < t \leq LUT(n).$$

12. The apparatus of claim 11, further comprising a gamma correction library storing a plurality of gamma correction tables, from which said corrected dither pattern generator selects said gamma correction table.

13. A method of converting a continuous-tone image having more than two gray levels to a bi-level image having only two gray levels, comprising the steps of:
   (a) storing at least one corrected threshold matrix having corrected threshold values obtained by applying an inverse gamma correction to a threshold matrix used for converting a gamma-corrected continuous-tone image to a bi-level image; and
   (b) comparing the gray levels in said continuous-tone image with said corrected threshold values, thereby generating said bi-level image.

14. The method of claim 13, wherein said step (a) stores a plurality of corrected threshold matrices having different threshold values, further comprising the step of:
   (c) selecting one of said corrected threshold matrices for use in said step (b).

15. An apparatus for converting a continuous-tone image having more than two gray levels to a bi-level image having only two gray levels, comprising:

a storage device storing at least one corrected threshold matrix having corrected threshold values obtained by applying an inverse gamma correction to a threshold matrix used for converting a gamma-corrected continuous-tone image to a bi-level image; and a dither processor coupled to said storage device, comparing the gray levels in said continuous-tone image with said corrected threshold values, thereby generating said bi-level image.

16. The apparatus of claim 15, wherein:

said storage device stores a plurality of corrected threshold matrices having different threshold values; and said dither processor selects one of said corrected threshold matrices.

* * * * *